United States Patent
Alanen et al.

(10) Patent No.: US 12,048,010 B2
(45) Date of Patent: Jul. 23, 2024

(54) DETECTING NEW TRANSMISSION OPPORTUNITIES

(71) Applicant: Nokia Technologies Oy, Espoo (FI)

(72) Inventors: Olli Alanen, Vantaa (FI); Enrico Henrik Rantala, Berkeley, CA (US); Mika Kasslin, Espoo (FI); Janne Marin, Espoo (FI); Veli-Matti Kolmonen, Espoo (FI)

(73) Assignee: Nokia Technologies Oy, Espoo (FI)

(*) Notice: Subject to any disclaimer, the term of this patent is extended or adjusted under 35 U.S.C. 154(b) by 310 days.

(21) Appl. No.: 17/766,441

(22) PCT Filed: Oct. 11, 2019

(86) PCT No.: PCT/US2019/055810
§ 371 (c)(1),
(2) Date: Apr. 4, 2022

(87) PCT Pub. No.: WO2021/071503
PCT Pub. Date: Apr. 15, 2021

(65) Prior Publication Data
US 2023/0117937 A1    Apr. 20, 2023

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC .................. H04W 74/0816; H04W 74/0866
See application file for complete search history.

(56) References Cited

U.S. PATENT DOCUMENTS

2007/0183392 A1    8/2007  Tandai et al.

OTHER PUBLICATIONS

"IEEE 802.11", Wikipedia, Retrieved on Apr. 7, 2022, Webpage available at: https://en.wikipedia.org/wiki/IEEE_802.11.
Cariou, "802.11 EHT Proposed PAR", Intel, IEEE P802.11 Wireless LANs, Mar. 2019, pp. 1-4.
"IEEE 802.11ac", Wikipedia, Retrieved on Apr. 7, 2022, Webpage available at: https://en.wikipedia.org/wiki/IEEE_802.11ac-2013.
"IEEE 802.11n", Wikipedia, Retrieved on Apr. 7, 2022, Webpage available at: https://en.wikipedia.org/wiki/IEEE_802.11n-2009.

(Continued)

*Primary Examiner* — James P Duffy
(74) *Attorney, Agent, or Firm* — Nokia Technologies Oy

(57) ABSTRACT

This document discloses a solution for detecting a transmission opportunity. According to an aspect, a method comprises as performed by an apparatus of a first wireless network: detecting a first transmission from a first apparatus of a second wireless network different from the first wireless network; transmitting, to a second apparatus of the first wireless network, a transmission mode request, wherein the transmission mode request indicates a request to transmit from the apparatus to the second apparatus at least during an interframe space of a transmission opportunity between the first apparatus and another apparatus of the second wireless network, receiving a transmission mode response from the second apparatus, wherein the transmission mode response indicates acceptance of the request; in response to detecting a second transmission from the first apparatus, transmitting a data frame during an interframe space following the second transmission.

21 Claims, 6 Drawing Sheets

(56) References Cited

OTHER PUBLICATIONS

"IEEE 802.11be", Wikipedia, Retrieved on Apr. 7, 2022, Webpage available at: https://en.wikipedia.org/wiki/IEEE_802.11be.
Shih, "Look Who's Talking: Practical Approach for Achieving Scheduled WiFi in a Single Collision Domain", Georgia Institute of Technology, 2015, 16 pages.
"802.11bd", Wikipedia, Retrieved on Apr. 7, 2022, Webpage available at: https://en.wikipedia.org/wiki/IEEE_802.11.
"IEEE 802.11ax", Wikipedia, Retrieved on Apr. 13, 2022, Webpage available at: https://en.wikipedia.org/w/index.php?title=IEEE_802.11ax&redirect=no.
"IEEE 802.3", Wikipedia, Retrieved on Apr. 7, 2022, Webpage available at: https://en.wikipedia.org/wiki/IEEE_802.3.
International Search Report and Written Opinion received for corresponding Patent Cooperation Treaty Application No. PCT/US2019/055810, dated Jun. 8, 2020, 10 pages.
Tandai et al., "Performance Enhancement of IEEE 802.11 WLAN with a Cognitive Radio Technique", IEICE Transactions on Communications, vol. E92-B, No. 8, Aug. 2009, pp. 2649-2666.

DETECTING NEW TRANSMISSION OPPORTUNITIES

RELATED APPLICATION

This application claims priority to PCT Application PCT/US2019/055810, filed on Oct. 11, 2019, the content of which is incorporated herein by reference in its entirety.

FIELD

Various embodiments described herein relate to the field of wireless communications and, particularly, to monitoring a radio channel for a transmission opportunity.

BACKGROUND

Constant demand of higher throughput and capacity and density of various wireless networks sets a demand for improving spectral efficiency. When the spectral efficiency is high, capacity of a radio channel on a given frequency band is highly utilized.

BRIEF DESCRIPTION

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a first wireless network, comprising means for performing: detecting a first transmission from a first apparatus of a second wireless network different from the first wireless network; transmitting, to a second apparatus of the first wireless network, a transmission mode request, wherein the transmission mode request indicates a request to transmit from the apparatus to the second apparatus at least during an interframe space of a transmission opportunity between the first apparatus and another apparatus of the second wireless network, receiving a transmission mode response from the second apparatus, wherein the transmission mode response indicates acceptance of the request; in response to detecting a second transmission from the first apparatus, transmitting a data frame during an interframe space following the second transmission.

In an embodiment, the interframe space is a time interval between two frames of the same transmission opportunity, wherein the first apparatus neither transmits nor receives during the interframe space.

In an embodiment, the two frames are a data frame and an acknowledgment frame acknowledging the data frame, or wherein the two frames are a request-to-send frame and a clear-to-send frame responding to the request-to-send frame, or wherein the two frames are two data frames.

In an embodiment, the interframe space is a short interframe space of IEEE 802.11 specifications.

In an embodiment, a length of the interframe space is 16 microseconds.

In an embodiment, the apparatus is for a first access point, and wherein the first apparatus is a second access point.

In an embodiment, the data frame comprises a header without a preamble.

In an embodiment, the data frame is without a dedicated field for an association identifier or a network identifier.

In an embodiment, the association identifier or the network identifier is embedded into a frame check sequence comprised in the data frame to verify correct decoding of the data frame.

In an embodiment, the means are configured to acquire, before transmitting the data frame, symbol synchronization and frequency synchronization from the second transmission and transmit the data frame as symbol and frequency-synchronized to the second transmission.

In an embodiment, the means are configured to perform channel contention after detecting an end of the second transmission and before transmitting the data frame, wherein the channel contention is performed by using the fastest channel access category supported by the apparatus.

In an embodiment, the means are configured to estimate an end of the second transmission on the basis of header information of the second transmission, and wherein a start time of the transmission of the data frame is based on the estimated end of the second transmission.

In an embodiment, a length of the data frame is 12 microseconds.

According to an aspect, there is provided an apparatus for a first wireless network, comprising means for performing: detecting a first transmission from a first apparatus of a second wireless network different from the first wireless network; receiving, from a second apparatus of the first wireless network, a transmission mode request, wherein the transmission mode request indicates a request to transmit from the second apparatus to the apparatus at least during an interframe space of a transmission opportunity between the first apparatus and another apparatus of the second wireless network; transmitting a transmission mode response to the second apparatus, wherein the transmission mode response indicates acceptance of the request; in response to detecting a second transmission from the first apparatus, receiving from the second apparatus a data frame during an interframe space following the second transmission.

In an embodiment, the interframe space is a time interval between two frames of the same transmission opportunity, wherein the first apparatus neither transmits nor receives during the interframe space.

In an embodiment, the two frames are a data frame and an acknowledgment frame acknowledging the data frame, or wherein the two frames are a request-to-send frame and a clear-to-send frame responding to the request-to-send frame, or wherein the two frames are two data frames.

In an embodiment, the interframe space is a short interframe space of IEEE 802.11 specifications.

In an embodiment, a length of the interframe space is 16 microseconds.

In an embodiment, the apparatus is for a terminal device, and wherein the first apparatus is an access point.

In an embodiment, the data frame comprises a header without a preamble.

In an embodiment, the data frame is without a dedicated field for an association identifier or a network identifier.

In an embodiment, the association identifier or the network identifier is embedded into a frame check sequence comprised in the data frame to verify correct decoding of the data frame, and wherein the means are configured to determine that the data frame is addressed to the apparatus, if processing the frame check sequence indicates correct reception of the data frame.

In an embodiment, the means are configured to acquire, from the second transmission, symbol synchronization and frequency synchronization for receiving the data frame and to receive the data frame as symbol and frequency-synchronized to the second transmission.

In an embodiment, a length of the data frame is 12 microseconds.

In an embodiment, the means are configured to estimate an end of the second transmission on the basis of header information of the second transmission, and wherein a start time of the transmission of the data frame is based on the estimated end of the second transmission.

In an embodiment, the means comprises: at least one processor; and at least one memory including computer program code, the at least one memory and computer program code configured to, with the at least one processor, cause the performance of the apparatus.

According to an aspect, there is provided a method for an apparatus of a first wireless network, comprising: detecting, by the apparatus, a first transmission from a first apparatus of a second wireless network different from the first wireless network; transmitting, by the apparatus to a second apparatus of the first wireless network, a transmission mode request, wherein the transmission mode request indicates a request to transmit from the apparatus to the second apparatus at least during an interframe space of a transmission opportunity between the first apparatus and another apparatus of the second wireless network; receiving, by the apparatus, a transmission mode response from the second apparatus, wherein the transmission mode response indicates acceptance of the request; in response to detecting a second transmission from the first apparatus, transmitting by the apparatus a data frame during an interframe space following the second transmission.

In an embodiment, the interframe space is a time interval between two frames of the same transmission opportunity, wherein the first apparatus neither transmits nor receives during the interframe space.

In an embodiment, the two frames are a data frame and an acknowledgment frame acknowledging the data frame, or wherein the two frames are a request-to-send frame and a clear-to-send frame responding to the request-to-send frame, or wherein the two frames are two data frames.

In an embodiment, the interframe space is a short interframe space of IEEE 802.11 specifications.

In an embodiment, a length of the interframe space is 16 microseconds.

In an embodiment, the apparatus is for a first access point, and wherein the first apparatus is a second access point.

In an embodiment, the data frame comprises a header without a preamble.

In an embodiment, the data frame is without a dedicated field for an association identifier or a network identifier.

In an embodiment, the association identifier or the network identifier is embedded into a frame check sequence comprised in the data frame to verify correct decoding of the data frame.

In an embodiment, the apparatus acquires, before transmitting the data frame, symbol synchronization and frequency synchronization from the second transmission and transmits the data frame as symbol and frequency-synchronized to the second transmission.

In an embodiment, the apparatus performs channel contention after detecting an end of the second transmission and before transmitting the data frame, wherein the channel contention is performed by using the fastest channel access category supported by the apparatus.

In an embodiment, the apparatus estimates an end of the second transmission on the basis of header information of the second transmission, and wherein a start time of the transmission of the data frame is based on the estimated end of the second transmission.

In an embodiment, a length of the data frame is 12 microseconds.

According to an aspect, there is provided a method for an apparatus of a first wireless network, comprising: detecting, by the apparatus, a first transmission from a first apparatus of a second wireless network different from the first wireless network; receiving, by the apparatus from a second apparatus of the first wireless network, a transmission mode request, wherein the transmission mode request indicates a request to transmit from the second apparatus to the apparatus at least during an interframe space of a transmission opportunity between the first apparatus and another apparatus of the second wireless network; transmitting, by the apparatus, a transmission mode response to the second apparatus, wherein the transmission mode response indicates acceptance of the request; in response to detecting a second transmission from the first apparatus, receiving by the apparatus from the second apparatus a data frame during an interframe space following the second transmission.

In an embodiment, the interframe space is a time interval between two frames of the same transmission opportunity, wherein the first apparatus neither transmits nor receives during the interframe space.

In an embodiment, the two frames are a data frame and an acknowledgment frame acknowledging the data frame, or wherein the two frames are a request-to-send frame and a clear-to-send frame responding to the request-to-send frame, or wherein the two frames are two data frames.

In an embodiment, the interframe space is a short interframe space of IEEE 802.11 specifications.

In an embodiment, a length of the interframe space is 16 microseconds.

In an embodiment, the apparatus is for a terminal device, and wherein the first apparatus is an access point.

In an embodiment, the data frame comprises a header without a preamble.

In an embodiment, the data frame is without a dedicated field for an association identifier or a network identifier.

In an embodiment, the association identifier or the network identifier is embedded into a frame check sequence comprised in the data frame to verify correct decoding of the data frame, and wherein the apparatus determines that the data frame is addressed to the apparatus, if processing the frame check sequence indicates correct reception of the data frame.

In an embodiment, the apparatus acquires, from the second transmission, symbol synchronization and frequency synchronization for receiving the data frame and to receive the data frame as symbol and frequency-synchronized to the second transmission.

In an embodiment, a length of the data frame is 12 microseconds.

In an embodiment, the apparatus estimates an end of the second transmission on the basis of header information of the second transmission, and wherein a start time of the transmission of the data frame is based on the estimated end of the second transmission.

According to an aspect, there is provided a computer program product embodied on a computer-readable medium and comprising a computer program code readable by a computer for an apparatus of a first wireless network, wherein the computer program code configures the computer to carry out a computer process comprising: detecting a first transmission from a first apparatus of a second wireless network different from the first wireless network; transmitting, to a second apparatus of the first wireless network, a transmission mode request, wherein the transmission mode request indicates a request to transmit from the apparatus to the second apparatus at least during an interframe space of a transmission opportunity between the first apparatus and another apparatus of the second wireless network, receiving a transmission mode response from the second apparatus, wherein the transmission mode response indicates acceptance of the request; in response to detecting a second transmission from the first apparatus, transmitting a data frame during an interframe space following the second transmission.

According to an aspect, there is provided a computer program product embodied on a computer-readable medium and comprising a computer program code readable by a computer for an apparatus of a first wireless network, wherein the computer program code configures the computer to carry out a computer process comprising: detecting a first transmission from a first apparatus of a second wireless network different from the first wireless network; receiving, from a second apparatus of the first wireless network, a transmission mode request, wherein the transmission mode request indicates a request to transmit from the second apparatus to the apparatus at least during an interframe space of a transmission opportunity between the first apparatus and another apparatus of the second wireless network, transmitting a transmission mode response to the second apparatus, wherein the transmission mode response indicates acceptance of the request; in response to detecting a second transmission from the first apparatus, receiving from the second apparatus a data frame during an interframe space following the second transmission.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
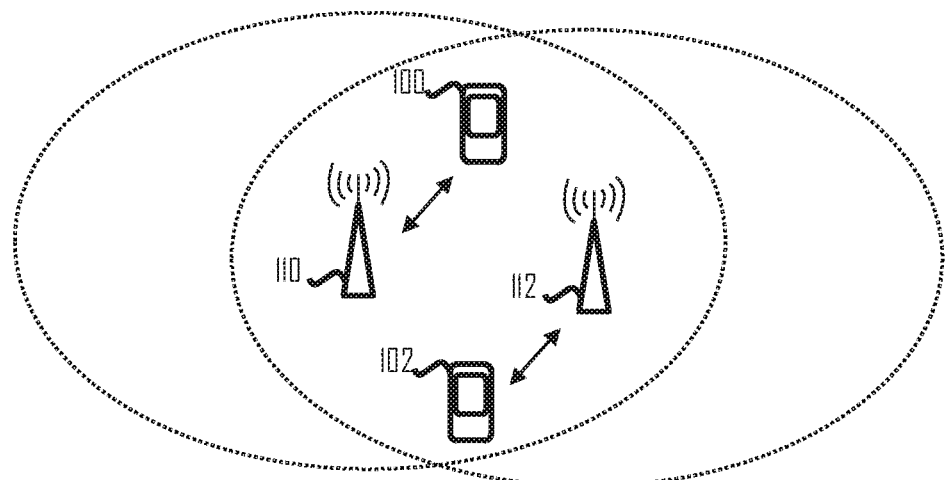

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100, 102. Each AP may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. The APs 110, 112 may also provide access to other networks, e.g. the Internet. In another embodiment, the BSS may comprise a plurality of APs to form an extended service set (ESS), e.g. the AP 110 or 112 may belong to the same ESS with another AP and have the same service set identifier (SSID). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

Some IEEE 802.11 networks employ channel contention based on carrier sense multiple access with collision avoidance (CSMA/CA) for channel access. Every device attempting to gain a transmission opportunity (TXOP) is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the device gains the TXOP and starts frame transmission. If another device gains the TXOP before that, the backoff value computation may be suspended, and the device continues the backoff computation after the TXOP of the other device has ended and the primary channel is sensed to be idle. The time duration (the backoff value) may not be decremented during the TXOP of the other device, but the time duration that already lapsed before the suspension may be maintained, which means that the device now has a higher probability of gaining the TXOP. Other wireless networks may employ similar channel contention procedures. For example, the LTE systems employ a listen-before-talk (LBT) protocol based on sensing the channel before the channel access.

The STA 100, 102 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). A separate user authentication may follow association, which may also comprise building an encryption key used in the BSS. It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. discovery frames.

In the scenario of FIG. 1, the station 100 is associated to the access node 110 while the station 102 is associated to the access node 112. The stations 100, 102 and the APs 110, 112 are within the proximity of one another such that every device is capable of detecting one another's transmissions. Accordingly, the station 102 and the AP 112 are capable of detecting the frame transmissions in the overlapping BSS provided by the AP 110.

In systems employing the channel contention or LBT, the channel sensing delays the channel access. Some applications set very strict requirements for latency, and such channel access delay due to the channel contention may be a limiting factor in a congested channel. For example, a few consecutive TXOPs in one's own BSS or in an overlapping BSS (OBSS) may prevent meeting the latency requirement.

Figure 2:
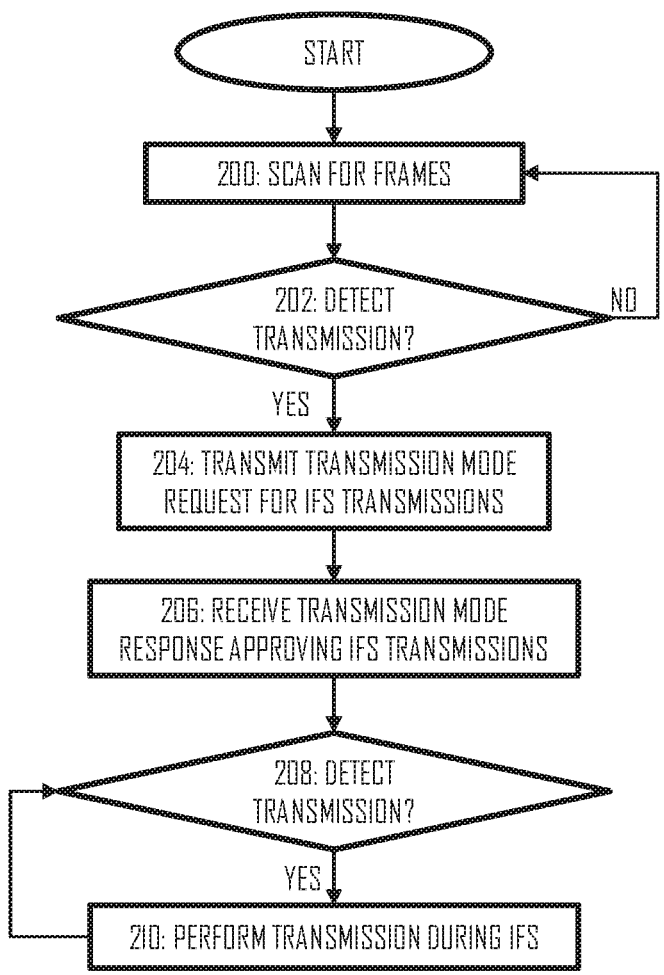
FIGS. 2 and 3 illustrate embodiments of processes for utilizing inter-frame spaces of a transmission opportunity for transmission of a data frame.

Referring to FIG. 2, let us describe a process for detecting a transmission opportunity in an apparatus of a first wireless network, e.g. the access node 112. The process comprises as performed by the apparatus: detecting in block 202 a first transmission from a first apparatus of a second wireless network different from the first wireless network; transmitting (block 204), to a second apparatus of the first wireless network, a transmission mode request, wherein the transmission mode request indicates a request to transmit from the apparatus to the second apparatus at least during an interframe space of a transmission opportunity between the first apparatus and another apparatus of the second wireless network; receiving (block 206) a transmission mode response from the second apparatus, wherein the transmission mode response indicates acceptance of the request; and in response to detecting (block 208) a second transmission from the first apparatus, transmitting (block 210) a data frame during an interframe space following the second transmission.

The detection of the first transmission and the second transmission may be made while monitoring (block 200) a frequency channel operated by the first wireless network and the second wireless network. While no radio energy and frames are detected, the channel monitoring may be resumed.

Figure 3:
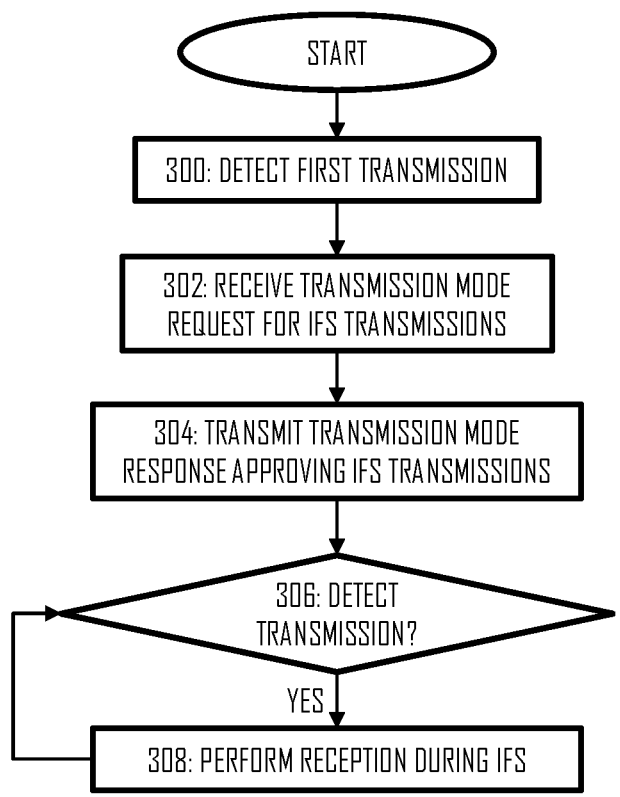

FIG. 3 illustrates a flow diagram of a corresponding procedure for the second apparatus of the first wireless network that is an intended recipient for the data frame. Referring to FIG. 3, the process comprises as performed by the second apparatus of the first wireless network: detecting (block 300) the first transmission from the first apparatus of the second wireless network; receiving the transmission mode request (block 302); transmitting (block 304) the transmission mode response indicating the acceptance of the request and, in response to detecting (block 306) the second transmission from the first apparatus, receiving (block 308) the data frame during the interframe space following the second transmission.

The embodiments of FIGS. 2 and 3 employ the interframe spaces of a TXOP of a device of another wireless network. As described above, the TXOP may be a specific time interval during which a TXOP owner owns the channel and carries out frame transmissions with another device of the same wireless network as the TXOP owner. Conventionally, other devices may refrain from channel access during the TXOP. When the TXOP involves multiple frame transmissions, transmission gaps called inter-frame spaces are provided between the multiple frame transmissions. The inter-frame space (IFS) may be understood as a time gap on a media between two physical packets. In other words, the IFS is a time interval between two frames of the same transmission opportunity, wherein the first apparatus of the second wireless network neither transmits nor receives during the IFS. In 802.11 specifications, a control frame follows the previous frame after a short IFS (SIFS) while data and management frames follows the previous frame after a distributed coordination function IFS (DIFS) or an arbitration IFS (AIFS). The SIFS is shorter than the DIFS and the AIFS, and the embodiments of FIGS. 2 and 3 may employ any one or more of the IFSs of the TXOP of the other wireless network.

In an embodiment, the IFS is provided between two frames that are: a data frame and an acknowledgment frame acknowledging the data frame; or a request-to-send (RTS) frame and a clear-to-send (CTS) frame responding to the RTS frame; or two data frames. The two frames may be other frames as well.

In an embodiment, a length of the IFS is at least 16 microseconds (us).

In an embodiment, a length of the IFS is greater than 3 us and less than 160 us.

In an embodiment, a length of the data frame is 12 microseconds.

In an embodiment, the apparatus executing the process of FIG. 2 is the access point 112, and the first apparatus is the access point 110. The apparatus executing the process of FIG. 3 may be the station 102.

Figure 4:
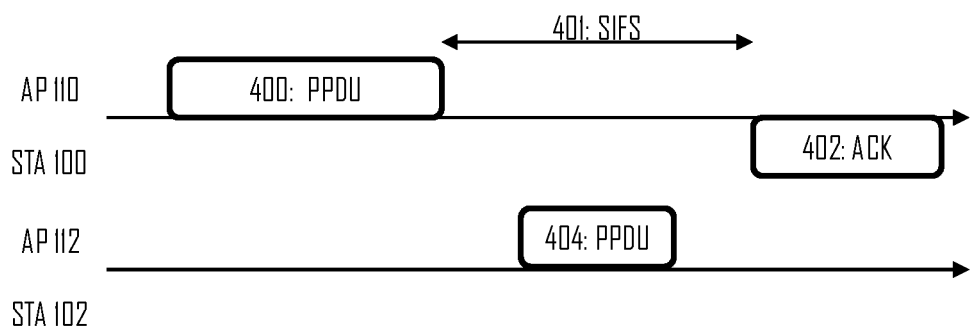
FIG. 4 illustrates transmission of a data frame during an inter-frame space.

FIG. 4 illustrates the usage of the IFS according to an embodiment. Because of the short duration of the IFS, the data frame transmitted in block 210 and received in block 308 may be a very short physical layer protocol data unit (PPDU). Referring to FIG. 4, upon detecting the PPDU 400 transmitted by the AP 110, the AP 112 and the STA 102 both capable of detecting the PPDU 400 are aware that an IFS will follow the PPDU 400, thus creating a transmission opportunity for a PPDU 404 that is shorter than the length of the IFS. Upon negotiating the utilization of the IFSs for frame transmissions, the devices 102, 112 may carry out the transmission and reception of a PPDU 404 during the IFS following the PPDU 400. In the embodiment of FIG. 4, the IFS is a SIFS 401 between the PPDU (a data frame) 400 and an acknowledgment frame (ACK) 402 acknowledging the reception of the PPDU 400 at the station 100.

Figure 5:
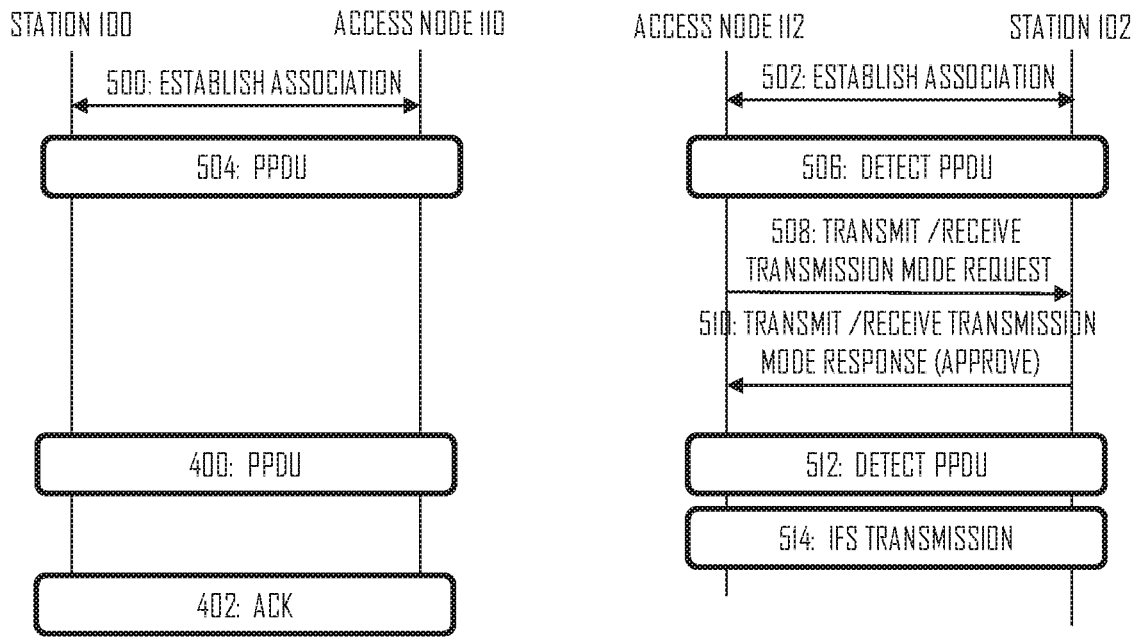
FIGS. 5 and 6 illustrate procedures for initiating an inter-frame space transmission mode in various situations.
Figure 6:
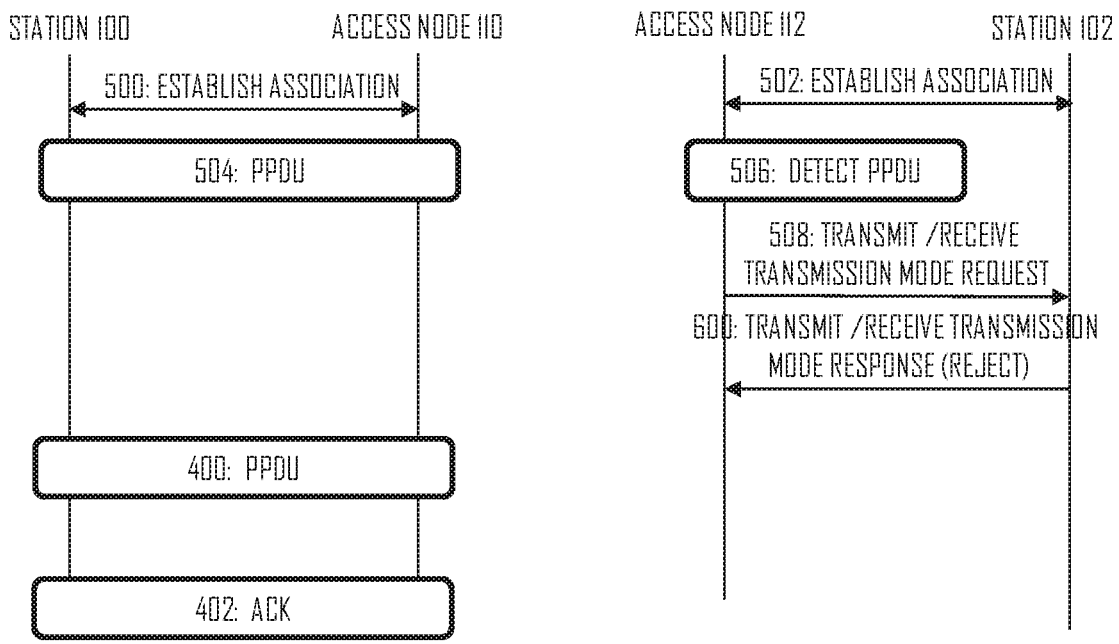

In order to verify that both devices 110, 112 being capable of detecting the IFSs, the devices may carry out the negotiation with the transmission mode request and associated transmission mode response. FIGS. 5 and 6 illustrate embodiments of signalling for carrying out the transmission mode negotiation. Referring to FIG. 5, the station 100 may associate to the access node 110 in step 500 and the station 102 may associate to the access node 112 in step 502. In step 504, the station or the access node 110 transmits a frame, e.g. a PPDU 504. In the embodiment of FIG. 5, both devices 102, 112 detect the frame in step 506. Upon detecting the frame, the access node 112 may transmit the transmission mode request to the station 102 in step 508, and the station 102 receives the transmission mode request.

In an embodiment, the transmission mode request comprises at least one information element indicating the PPDU 504, e.g. an information element comprised in the PPDU 504. The at least one information element may comprise at least one of the following: an association identifier, a transmitter address, a receiver address, and a network identifier such as a BSS identifier.

Upon receiving the transmission mode request in step 508, the station 102 may determine whether or not it has detected the PPDU indicated by the at least one information element. In this embodiment, the station has detected the PPDU 504 so the station 102 may determine to approve the transmission mode request. As a consequence, the station 102 transmits the transmission mode response indicating the approval to the access node 112. After the transmission mode employing the IFSs for frame transmissions has been negotiated between the station 102 and the access node 112, the station 102 and the access node 112 may start listening for a trigger frame that triggers the transmission of the data frame during an IFS following the trigger frame. The trigger frame may be the PPDU transmitted in block 400 (see FIG. 4). Upon detecting the PPDU 400 in step 512 and determining that the condition for triggering the transmission of the data frame during the IFS following the PPDU 400 has been met, the access node 112 and the station may carry out the transmission of the data frame in step 514 during the IFS following the PPDU 400. After the transmission of the data frame, the station 100 and the access node 110 may carry out the transmission of the subsequent frame of the TXOP, e.g. the acknowledgment frame 402.

FIG. 6 illustrates the signalling in a case where the station is incapable of detecting the PPDU 504. As illustrated by block 506 in FIG. 6, only the access node 112 detects the PPDU 504 and, upon detecting the PPDU, the access node 112 may initiate the transmission mode negotiation, as described above with respect to FIG. 5. Upon receiving the transmission mode request in step 508, the station 102 may determine that it has not detected the PPDU indicated by the at least one information element comprised in the transmission mode request. As a consequence, the station 102 generates the transmission mode response message that comprises an information element rejecting the request and transmits the transmission mode response message to the access node in step 600. In such a case, the access node 112 and the station 102 may not utilize the IFSs between the frames exchanged between the station 100 and the access node 110 in order to avoid unnecessary transmissions.

FIG. 6 has been described in the context where the station rejects the transmission mode request on the basis of not detecting the PPDU. In other embodiments, the station 102 may detect the PPDU and yet reject the request. For example, the station 102 may determine that a received signal strength of the detected PPDU is not above a threshold and, as a consequence, rejects the transmission mode requests. Yet other criteria may be employed when determining whether or not to approve the transmission mode request.

While FIGS. 5 and 6 have been described in the context where the access node 112 initiates the transmission mode negotiation and transmits the transmission mode request. In other embodiments, the station 102 initiates the transmission mode negotiation and transmits the transmission mode request to the access node 112, and the access node transmits the transmission mode response.

The trigger frame detected in step 512 and triggering the transmission of the data frame during the IFS may be any frame transmitted/received by the TXOP owner. In an embodiment, characteristics of the trigger frame are negotiated to establish a common understanding of when the data frame transmission during the IFS is triggered. The characteristics may include a specific transmitter address (e.g. an address of the access node 110), a specific receiver address (e.g. an address of the station 100), a specific value of a BSSID field (e.g. a BSSID of the network of the devices 100, 110), a specific value of a 'To DS' field, and/or a specific value of a 'From DS' field. 'DS' refers to a distribution system that may be an infrastructure that connects multiple access nodes together to form an ESS. The DS may be an IEEE 802.3 Ethernet wired network or a wireless backhaul, for example. The negotiation of the transmission mode may include negotiation of a transmission configuration, including parameters such as a beamforming configuration and/or a modulation and coding scheme for the data frame. Upon negotiating the transmission mode in steps 508 and 510, the access node 112 and the station 102 may start monitoring the channel for a frame that fulfils the characteristics of the trigger frame. Upon detecting such a frame in step 512, step 514 may be triggered in both devices 102, 112.

As described above, the procedure of FIG. 5 may be used to negotiate the initiation of the transmission mode where transmissions are performed within the detected IFSs. The procedure may also be used to update parameters of the transmission mode, e.g. to change a set of trigger frames that trigger the frame transmission within an IFS, to change a safety margins at either end or both ends of the frame(s) transmitted during the IFS, and/or to change an OBSS or a transmitter whose IFSs are employed for the frame transmissions. The configured safety margins may depend on channel conditions between the devices 102, 112, e.g. from a propagation delay between the devices. Such conditions may be measured, and safety margins agreed in steps 508 and 510.

As described above, the data frame 404 transmitted during the IFS may be shorter than a conventional frame transmitted and/or received by the TXOP owner. The data frame 404 may thus employ a frame format that differs from the conventional frames transmitted and/or received by the TXOP owner.

In an embodiment, the header is reduced with respect to such conventional frames. The transmitter of the data frame may omit one or more header fields that are present in the conventional frames.

In an embodiment, the data frame 404 comprises a header without a preamble.

In an embodiment, the data frame is without a dedicated field for an association identifier or a network identifier.

In an embodiment, the minimum information needed in the data frame are: information to validate that the data frame is from the transmitting device (e.g. the access node 112) and targeted to the receiving device (e.g. the station 102); information to check whether or not the data frame has been received correctly; and information to demodulate and decode content of the data frame.

With respect to the validation, the data frame may contain a medium access control (MAC) header that contains only a sequence number that is needed for security and the validation. With respect to the checking, the data frame may include a frame check sequence (FCS). The FCS may be understood as an error-detecting code added to the data frame. The FCS is thus added redundancy that improves transmission reliability in the form of error detection.

The BSSID and the association identifier may also be provided but, in an embodiment, such information elements may be embedded into the FCS instead of including them in a dedicated field in the data frame. In such an approach, the receiver of the data frame considers the data frame not to be addressed to it, if the FCS check fails. On the other hand, if the FCS check passes, the receiver knows the data frame was intended for it. In another embodiment, the BSSID and AID are provided in one or more dedicated fields in the MAC header.

With respect to the demodulation and decoding, the data frame may contain at least one training field. In an embodiment, the data frame comprises only one training field. Even a single training field symbol may be enough to perform channel estimation and, optionally, other processing needed for the demodulation and decoding. In other embodiments, more than one training field symbol is used. An example of the structure of the data frame is illustrated in FIG. 7.

Figure 7:
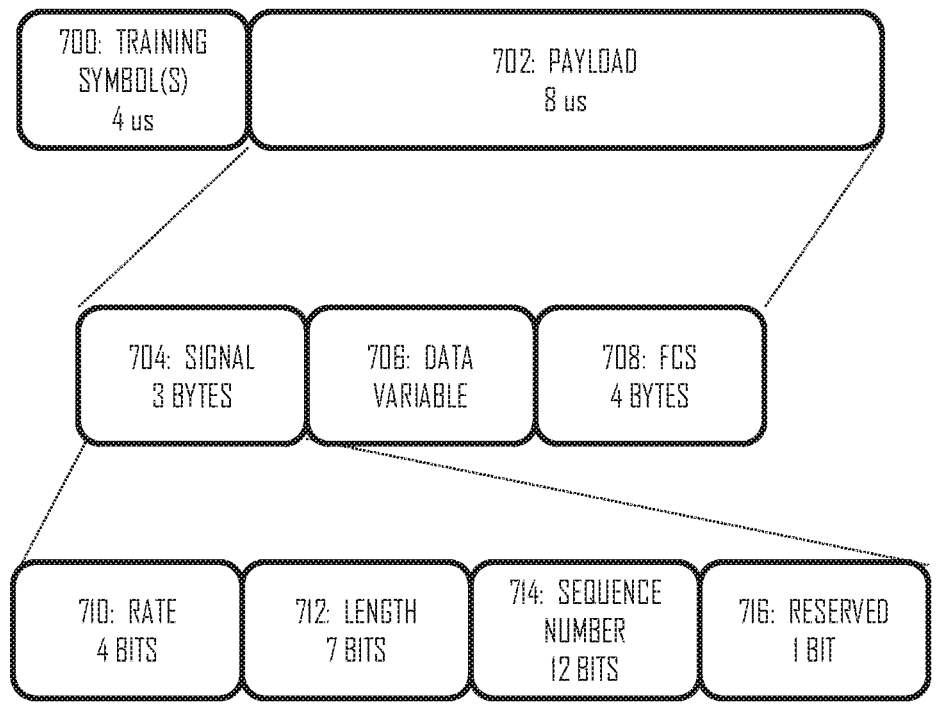
FIG. 7 illustrates an embodiment of a structure of the data frame having a reduced header.

Referring to FIG. 7, the data frame may comprise or consist of a training field 700 and a payload part. In the embodiment of FIG. 7, the total length of the data frame is 12 us, wherein the training field is 4 us and the payload part 8 us. As described above, the training field may have one training symbol or multiple training symbols. A symbol duration may be 4 us, and the data frame may be generated according to orthogonal frequency division multiplexing (OFDM) principles. The payload part 702 may comprise a data field 706 carrying payload data, and the FCS 708. Furthermore, the payload part may include a signalling field 704 carrying signalling information. Exemplary lengths of the fields 704 to 708 in bytes are illustrated in FIG. 7. The signalling field may include the above-described sequence number 714 of the data frame, an information element 712 indicating a length of the data frame (if/when the data field 706 is configured to have a variable length), and information element indicating a data rate of the data frame. A bit or bits 716 may be reserved for further use. The number of data bits/bytes that can be fit to the data frame depends on a modulation and coding scheme (MCS) employed for the data frame. Table 1 below presents an example of the possible MCS options. If the length of the data field 706 is less than its nominal length, padding may be used to fill the remaining symbols.

TABLE 1

| MCS | Number of data bits per symbol | Data bytes |
| --- | --- | --- |
| QPSK ½ | 52 | 6 |
| QPSK ¾ | 78 | 12 |
| 16-QAM ½ | 104 | 19 |
| 16-QAM ¾ | 156 | 32 |
| 64-QAM ⅔ | 208 | 45 |
| 64-QAM ¾ | 234 | 51 |
| 64-QAM ⅚ | 260 | 58 |
| 256-QAM ¾ | 312 | 71 |

In the embodiments where the header of the data frame 404 is reduced, the devices 102, 112 may exploit at least some signalling information comprised in the frame(s) transmitted by the TXOP owner, e.g. the PPDU 400. In an embodiment, the devices 102, 112 acquire, before transmitting the data frame in step 514, for example, symbol synchronization and frequency synchronization from the detected (second) transmission, e.g. the PPDU 400. Accordingly, a transmitter of the data frame may then transmit and a receiver of the data frame may receive the data frame by using the frequency and symbol timing of the second transmission. In other words, the data frame is transmitted as symbol-synchronized and frequency-synchronized to the second transmission. Using the same symbol timing may mean that the data frame is transmitted one or more symbol durations after the last symbol of the second transmission. The one or more symbol durations define the above-described safety margin to the second transmission. The safety margin may, however, be shorter than one symbol duration. The resolution may be defined with 1 us granularity, for example. In these embodiments, exploiting the detected second transmission of the TXOP owner enables reduction of the size of the training field(s), for example.

In an embodiment, at least the transmitter of the data frame among the devices 102, 112 estimates an end of the second transmission on the basis of header information of the second transmission, and a start time of the transmission of the data frame is based on the estimated end of the second transmission. The transmitter of the data frame may thus switch its radio transceiver from a reception mode to a transmission at the estimated end of the second transmission. As described above, the IFS is a short time gap and, even if the safety margins were applied, the safety margin at the head of the data frame may be too short to switch the radio transceiver from the reception mode to the transmission mode upon detecting that no more contents of the second transmission are received. Therefore, this embodiment enables estimation of the end of the second transmission before the second transmission ends and switch from the reception mode to the transmission mode at the estimated end of the second transmission. In a similar manner, the receiver of the data frame may estimate the end of the second transmission on the basis of header information of the second transmission. The header information used for estimating the end of the second transmission may include a value of a length field and/or a value of a rate field in a preamble of the second transmission. In a case where the second transmission is a very high throughput (VHT) PPDU of 802.11 specifications, a value of a length of the second transmission indicated in a VHT signalling field B (VHT-SIG-B) may be used instead. Other frame types may provide other types of information in the header that enables estimation of an end time of the second transmission on the basis of the header information.

Figure 8:
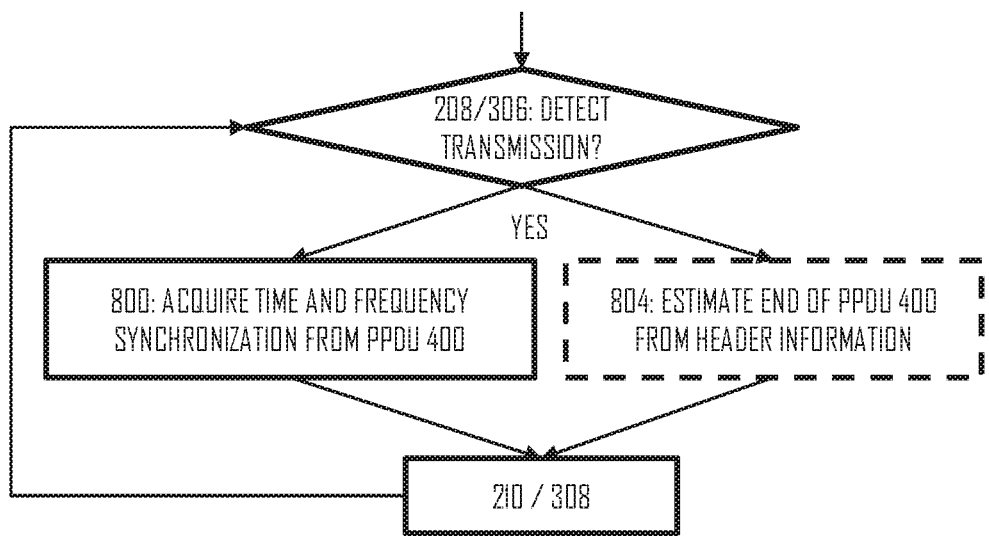
FIG. 8 illustrates some embodiments of the invention.

FIG. 8 illustrates a flow diagram that combines the two embodiments described above, although the two embodiments are not essential to one another. Referring to FIG. 8, upon detecting the second transmission in step 208 or 306, the device 102, 112 may acquire the time (or symbol) and frequency synchronization from the PPDU 400 of the second transmission, as described above. Thereafter, the data frame is transmitted/received in step 210/308 as time-and-frequency-synchronized to the second transmission.

At least the transmitter of the data frame (102 or 112) may further, or alternatively carry out block 804 where the transmitter estimates the end of the PPDU 400 of the second transmission on the basis of the header information of the PPDU 400. As a consequence, the transmitter is capable of switching its radio transceiver from the reception mode to the transmission mode earlier than in a situation where the transmitter would detect the end of the second transmission when or after the second transmission ends. Block 804 is optional and at least the receiver may omit block 804 because the receiver maintains its reception mode upon detecting the second transmission and at least until the end of the data frame reception in block 308.

Let us then describe the detection of the transmissions in various steps in the above-described embodiments. The detection of the first transmission in steps 208 and 306 may occur when the device (access node 112 or the station 102) is in an idle state and monitors the channel for radio energy. When the first transmission is present on the channel, the device detects radio energy on the channel and initiates synchronization to the radio energy. Upon finding a synchronization sequence, the synchronization is complete and the PPDU may be considered as detected.

Detection of the second transmission and, in particular, the IFS following the second transmission may occur when the PPDU (the second transmission) has already been detected (synchronization complete) and the device receiver further decodes header information of the PPDU to make the decision of whether or not the PPDU triggers the transmission of the data frame in the IFS following the second transmission.

Figure 9:
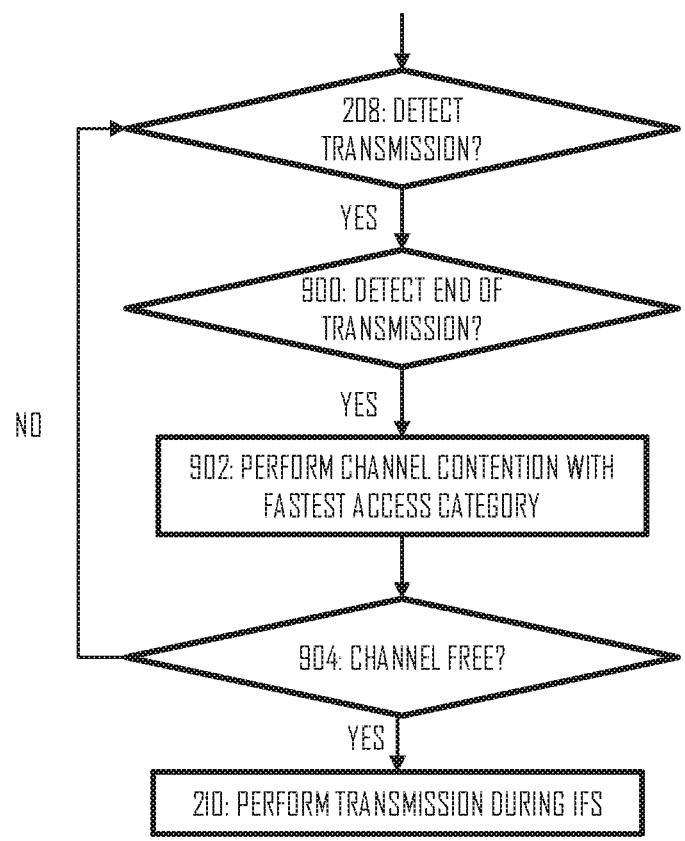
FIG. 9 illustrates a procedure for making expedited channel access during an inter-frame space.

In an embodiment, the transmitter of the data frame performs channel contention after the end of the second transmission and before transmitting the data frame. The channel contention may be performed by using the fastest channel access category supported by the apparatus. For example, the 802.11 specifications support the following access categories (AC): voice (AC_VO), video (AC_VI), best effort (AC_BE), and background (AC_BK). AC_VO has the shortest channel contention time defined in terms of a size of the contention window, for example, while AC_BK has the longest channel contention time. Accordingly, the AC_VO is the fastest channel access category for an 802.11 device. The fastest channel access category may thus be understood as channel access parameters that provide the fastest channel access possible for the transmitter. FIG. 9 illustrates an embodiment of a process where the transmitter uses the fastest channel access category. Referring to FIG. 9, Upon detecting the second transmission in step 208 and upon detecting an end of the second transmission in step 900, e.g. on the basis of the estimate based on the header information described above, the transmitter starts the channel contention by using the fastest channel access category (block 902). Upon detecting the channel to be free (block 904) during the channel contention, the transmitter may transmit the data frame in block 210. If the channel is detected to be busy and channel access cannot be made within the IFS, the process may return for detection of the next transmission that serves as a trigger for the transmission of the data frame during an IFS.

In an embodiment, the transmission mode negotiated in steps 508 and 510 is called an IFS transmission mode in which the transmissions are carried out only during the detected IFSs, or during some of the detected IFSs that have been configured in steps 508, 510. The devices 102, 112 may also employ a normal transmission mode where the devices 102, 112 perform conventional transmissions, e.g. frame transmission according to 802.11 specifications. When performing channel contention according to the normal transmissions, the backoff counter may be reduced in the above-described manner during the channel contention. As a consequence, a situation may occur where the backoff counter of the normal transmission mode is lower than the backoff counter of the IFS transmission mode using the fastest channel access category. In such a case where the transmitter has stored multiple alternative backoff counters for channel access, the transmitter may employ in block 902 the backoff counter that provides the fastest channel access. In general, the transmitter may use, amongst multiple mutually alternative configurations concurrently enabled, the configuration that provides the fastest channel access.

In an embodiment, a specific backoff counter is defined for the IFS transmission mode. The specific backoff counter may differ from the above-described backoff counter in the sense that the IFS backoff counter may count a number of detected idle IFSs. Upon detecting an idle IFS where no energy is measured on the channel, the transmitter may decrement the IFS backoff counter. When the IFS backoff counter reaches zero, i.e. a determine number of idle IFSs has been detected, the channel is accessed in the next idle IFS.

In an embodiment, the IFS transmission mode is negotiated in steps 508 and 510 to be applied only to one direction, e.g. uplink or downlink. As a consequence, both devices 102, 112 know their role when the transmission of the data frame is triggered, and the devices 102, 112 do not contend with one another for channel access.

In an embodiment, the IFS transmission mode is configured when establishing the association in step 502. In such an embodiment, the association may be configured to employ only the IFS transmission mode. The wireless network of the access node 112 may even be configured to operate only in the IFS transmission mode. In other embodiments, the association and/or the wireless network is configured to employ both the IFS transmission mode and the normal transmission mode concurrently. In other words, the devices 102, 112 attempt to gain the TXOPs in the conventional manner and, additionally, upon detecting a TXOP of an appropriate OBSS, the opportunity for the transmissions during the IFSs of the TXOP of the OBSS is also sought for.

Since the time slot for transmitting the data frame is very short and there is no knowledge of the next IFS transmission, acknowledging correct reception of the data frame may be disabled in the IFS transmission mode.

Figure 10:
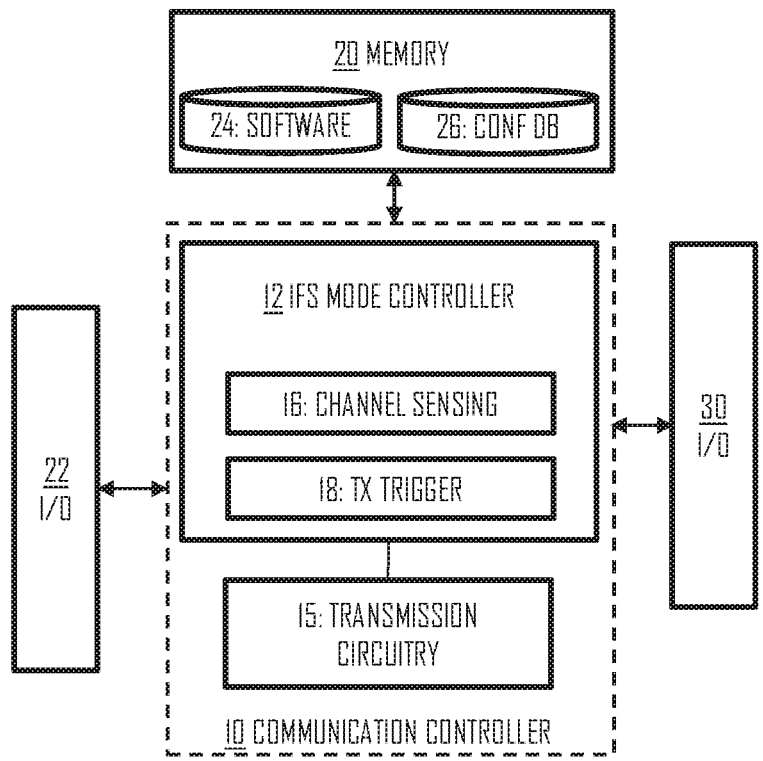
FIGS. 10 and 11 illustrate block diagrams of structures of apparatuses according to some embodiments of the invention.

FIG. 10 illustrates an embodiment of a structure of the above-mentioned functionalities of an apparatus executing the functions of the wireless device in the process of FIG. 2 or any one of the embodiment described above for the transmitter of the data frame during the IFS. The wireless device illustrated in FIG. 10 is the access node 112 but, in some embodiments, the wireless device is the station 102. In another embodiment, the apparatus carrying out the process of FIG. 2 or any one of its embodiments is comprised in such a wireless device, e.g. the apparatus may comprise a circuitry, e.g. a chip, a chipset, a processor, a micro controller, or a combination of such circuitries in the wireless device. The apparatus may be an electronic device comprising electronic circuitries for realizing some embodiments of the wireless device.

Referring to FIG. 10, the apparatus may comprise a first communication interface 22 or a communication circuitry configured to provide the apparatus with capability for bidirectional communication with stations over a radio interface. The communication interface 22 may comprise radio frequency circuitries for processing received control frames and data frames and control frames and data frames to be transmitted. The communication interface 22 may comprise standard well-known components such as an antenna array, amplifier, a filter, a frequency converter, and encoder/decoder circuitries. The communication interface 22 may comprise circuitries for processing messages described above in connection with steps 200, 204, 206, and 210, for example.

The apparatus may further comprise a second communication interface 30 or a communication circuitry configured to provide the apparatus with capability for bidirectional communication with other networks, e.g. the Internet or another computer network. In some embodiments, the communication interface 30 is used for the communication between the access nodes 110, 112. In other embodiments, the access nodes communicate over a radio interface through the communication interface 22. The communication interface 30 may comprise standard well-known components such as an amplifier, a filter, and encoder/decoder circuitries.

The apparatus may further comprise a memory 20 storing one or more computer program products 24 configuring the operation of at least one processor 10 of the apparatus. The memory 20 may further store a configuration database 26 storing operational configurations of the apparatus, e.g. configuration parameters of the IFS transmission mode and information on trigger frame(s) that trigger the transmission of the data frame during the IFS.

The apparatus may further comprise the at least one processor 10 configured to carry out the process of FIG. 2 or any one of its embodiments. The processor may realize a communication controller controlling the operation of the access node. Referring to FIG. 10, the processor(s) 10 comprise(s) an IFS mode controller 12 that controls the IFS transmission mode in the apparatus. The IFS mode controller 12 may comprise a channel sensing circuitry 16 configuring the communication interface 22 to receive a radio signal from a channel and to execute blocks 200, 202, and 208, for example. The channel sensing circuitry 16 may be configured to perform the frame detection and, upon detecting a frame in the IFS transmission mode, a transmission trigger circuitry 18 may analyse the detected frame and determine whether or not the detected frame is followed by an IFS that triggers the transmission of the data frame. The transmission trigger circuitry 18 may thus trigger the execution of block 210 in block 208, or trigger the channel contention of block 902 in block 900. The transmission trigger circuitry may further execute block 804 and configure a transmission circuitry 15 to execute block 800. Upon determining to trigger the transmission of the data frame, the transmission trigger circuitry 18 may activate the transmission circuitry to generate and transmit the data frame in block 210 or step 514, for example.

Figure 11:
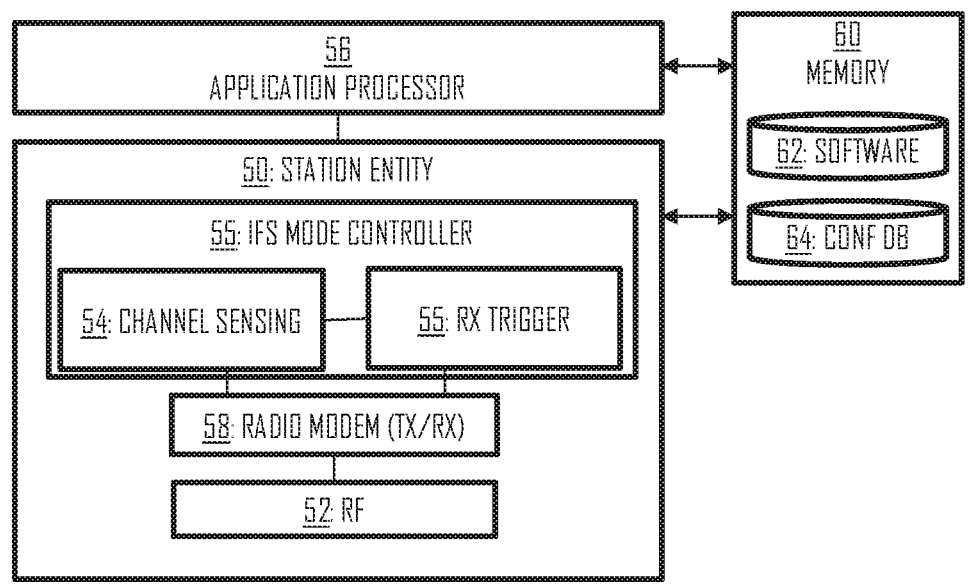

FIG. 11 illustrates an embodiment of a structure of the above-mentioned functionalities of an apparatus executing the functions of the receiver of the data frame in the process of FIG. 3 or any one of its embodiments. The apparatus may be a terminal device or a client device of a wireless network, e.g. the 802.11 network or a cellular communication network. The apparatus may be a circuitry or an electronic device realizing some embodiments of the invention in the station. The apparatus may comply with 802.11 specifications. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 11, the apparatus may comprise a station entity 50 providing the apparatus with capability of communicating in the wireless network of the access node 112. The station entity may comprise a radio interface 52 providing the apparatus with radio communication capability. The radio interface 52 may support frame transmission on the unlicensed frequency bands. It may comprise radio frequency converters and components such as an amplifier, filter, frequency-converter, (de)modulator, and encoder/decoder circuitries and one or more antennas. The station entity 50 may further comprise a radio modem 58 configured to carry out transmission and reception of messages in the wireless network.

The station entity 50 may further comprise an IFS mode controller 55 similar to that of the apparatus of FIG. 10. The IFS mode controller controls the IFS transmission mode in the receiver, and it may comprise a channel sensing circuitry 54 equivalent to the channel sensing circuitry 16. The channel sensing circuitry 54 may be configured to carry out block 300 but, in the receiver, trigger the execution of block 308 in block 306, for example. The channel sensing circuitry 16 may be configured to perform the frame detection and, upon detecting a frame in the IFS transmission mode, a reception trigger circuitry 55 may analyse the detected frame and determine whether or not the detected frame is followed by an IFS where to expect the data frame. The reception trigger circuitry 18 may thus trigger the execution of block 308. Upon determining to trigger the reception of the data frame, the reception trigger circuitry 18 may maintain the radio modem in the reception mode to receive data frame in block 308.

The apparatus may further comprise an application processor 56 executing one or more computer program applications that generate a need to transmit and/or receive data through the station entity 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The contents of the configuration database 64 may be similar to the contents of the configuration database 26.

In the embodiments of FIGS. 5 and 6, the access node 112 initiates the configuration of the IFS transmission mode and performs the transmission of the data frame. FIGS. 10 and 11 have also been described in the context where the access node is the transmitter of the data frame. However, in other embodiments the station 102 initiates the IFS transmission mode configuration by transmitting the transmission mode request. Regardless of which device initiates the IFS transmission mode negotiation, any one of the devices 102, 112 may be the transmitter of the data frame. As a consequence, the apparatus of FIG. 10 may comprise the reception trigger circuitry 55, and the apparatus of FIG. 11 may comprise the transmission trigger circuitry 18. Accordingly, both apparatuses may be configured with the capability of performing transmission and receptions during detected IFSs. Only the transmission or reception may be enabled at a time, although some embodiments of the IFS transmission mode may enable both devices 102, 112 to perform both transmissions and receptions during the IFS transmission mode. For example, the transmitter and receiver roles may be reconfigured via a negotiation procedure similar to the steps 508 and 510.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 9 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The term "non-transitory", as used herein, is a limitation of the medium itself (i.e., tangible, and not a signal) as opposed to a limitation on data storage persistency (e.g., RAM vs. ROM).

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a first wireless network, comprising:
   at least one processor; and
   at least one memory storing instructions that, when executed by the at least one processor, cause the apparatus at least to:
   detect a first transmission from a first apparatus of a second wireless network different from the first wireless network;
   transmit, to a second apparatus of the first wireless network, a transmission mode request, wherein the transmission mode request is indicative of a request to transmit from the apparatus to the second apparatus at least during an interframe space of a transmission opportunity between the first apparatus and another apparatus of the second wireless network;
   receive a transmission mode response from the second apparatus, wherein the transmission mode response is indicative of acceptance of the request; and
   in response to detecting a second transmission from the first apparatus, transmit a data frame during an interframe space following the second transmission.

2. The apparatus of claim 1, wherein the interframe space is a time interval between two frames of the same transmission opportunity, wherein the first apparatus neither transmits nor receives during the interframe space.

3. The apparatus of claim 1, wherein the interframe space is a short interframe space of IEEE 802.11 specifications.

4. The apparatus of claim 1, wherein the apparatus is for a first access point, and wherein the first apparatus is a second access point.

5. The apparatus of claim 1, configured to acquire, before transmitting the data frame, symbol synchronization and frequency synchronization from the second transmission and transmit the data frame as symbol and frequency-synchronized to the second transmission.

6. The apparatus of claim 1, configured to perform channel contention after detecting of an end of the second transmission and before transmitting the data frame, wherein the channel contention is performed by using the fastest channel access category supported by the apparatus.

7. The apparatus of claim 1, configured to estimate an end of the second transmission on the basis of header information of the second transmission, and wherein a start time of the transmission of the data frame is based on the estimated end of the second transmission.

8. An apparatus for a first wireless network, comprising:
   at least one processor; and
   at least one memory storing instructions that, when executed by the at least one processor, cause the apparatus at least to:
   detect a first transmission from a first apparatus of a second wireless network different from the first wireless network;
   receive, from a second apparatus of the first wireless network, a transmission mode request, wherein the transmission mode request is indicative of a request to transmit from the second apparatus to the apparatus at least during an interframe space of a transmission opportunity between the first apparatus and another apparatus of the second wireless network;
   transmit a transmission mode response to the second apparatus, wherein the transmission mode response is indicative of acceptance of the request; and in response to detecting a second transmission from the first apparatus, receiving from the second apparatus a data frame during an interframe space following the second transmission.

9. The apparatus of claim 8, wherein the interframe space is a time interval between two frames of the same transmission opportunity, wherein the first apparatus neither transmits nor receives during the interframe space.

10. The apparatus of claim 8, wherein the interframe space is a short interframe space of IEEE 802.11 specifications.

11. The apparatus of claim 8, wherein the apparatus is for a terminal device, and wherein the first apparatus is an access point.

12. The apparatus of claim 8, configured to acquire, from the second transmission, symbol synchronization and frequency synchronization for receiving the data frame and to receive the data frame as symbol and frequency-synchronized to the second transmission.

13. The apparatus of claim 8, configured to estimate an end of the second transmission on the basis of header information of the second transmission, and wherein a start time of the transmission of the data frame is based on the estimated end of the second transmission.

14. A method for an apparatus of a first wireless network, comprising:
  detecting, by the apparatus, a first transmission from a first apparatus of a second wireless network different from the first wireless network;
  transmitting, by the apparatus to a second apparatus of the first wireless network, a transmission mode request, wherein the transmission mode request indicates a request to transmit from the apparatus to the second apparatus at least during an interframe space of a transmission opportunity between the first apparatus and another apparatus of the second wireless network;
  receiving, by the apparatus, a transmission mode response from the second apparatus, wherein the transmission mode response indicates acceptance of the request; and
  in response to detecting a second transmission from the first apparatus, transmitting by the apparatus a data frame during an interframe space following the second transmission.

15. The method of claim 14, wherein the interframe space is a time interval between two frames of the same transmission opportunity, wherein the first apparatus neither transmits nor receives during the interframe space.

16. The method of claim 15, wherein the two frames are a data frame and an acknowledgment frame acknowledging the data frame, or wherein the two frames are a request-to-send frame and a clear-to-send frame responding to the request-to-send frame, or wherein the two frames are two data frames.

17. The method of claim 15, wherein a length of the data frame is 12 microseconds.

18. The method of claim 15, wherein a length of the interframe space is 16 microseconds.

19. The method of claim 15, wherein the apparatus performs channel contention after detecting an end of the second transmission and before transmitting the data frame, wherein the channel contention is performed by using the fastest channel access category supported by the apparatus.

20. A method for an apparatus of a first wireless network, comprising:
  detecting, by the apparatus, a first transmission from a first apparatus of a second wireless network different from the first wireless network;
  receiving, by the apparatus from a second apparatus of the first wireless network, a transmission mode request, wherein the transmission mode request indicates a request to transmit from the second apparatus to the apparatus at least during an interframe space of a transmission opportunity between the first apparatus and another apparatus of the second wireless network;
  transmitting, by the apparatus, a transmission mode response to the second apparatus, wherein the transmission mode response indicates acceptance of the request; and
  in response to detecting a second transmission from the first apparatus, receiving by the apparatus from the second apparatus a data frame during an interframe space following the second transmission.

21. A non-transitory computer readable medium comprising program instructions that, when executed by an apparatus, cause the apparatus to perform at least the following:
  detecting a first transmission from a first apparatus of a second wireless network different from the first wireless network;
  transmitting, to a second apparatus of the first wireless network, a transmission mode request, wherein the transmission mode request indicates a request to transmit from the apparatus to the second apparatus at least during an interframe space of a transmission opportunity between the first apparatus and another apparatus of the second wireless network;
  receiving a transmission mode response from the second apparatus, wherein the transmission mode response indicates acceptance of the request; and
  in response to detecting a second transmission from the first apparatus, transmitting a data frame during an interframe space following the second transmission.

* * * * *